United States Patent
Miyashita

(10) Patent No.: US 8,192,712 B2
(45) Date of Patent: Jun. 5, 2012

(54) CARBON MANUFACTURING METHOD

(75) Inventor: Kohichi Miyashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/086,022

(22) Filed: Apr. 13, 2011

(65) Prior Publication Data

US 2011/0300055 A1 Dec. 8, 2011

(30) Foreign Application Priority Data

Jun. 8, 2010 (JP) ................................. 2010-131322

(51) Int. Cl.
| | |
|---|---|
| *C01D 3/00* | (2006.01) |
| *C01D 7/00* | (2006.01) |
| *C01B 31/00* | (2006.01) |
| *C01B 31/08* | (2006.01) |
| *C01B 57/04* | (2006.01) |
| *C01B 47/00* | (2006.01) |
| *D01F 9/16* | (2006.01) |
| *C09C 1/56* | (2006.01) |
| *C07G 1/00* | (2006.01) |
| *C08H 7/00* | (2011.01) |

(52) U.S. Cl. ................. 423/445 R; 423/422; 423/447.9; 423/460; 530/500; 527/300; 527/400; 502/418; 201/2.5; 201/25; 252/444; 252/445; 252/422; 252/423; 252/447

(58) Field of Classification Search .................... None
See application file for complete search history.

(56) References Cited

U.S. PATENT DOCUMENTS

| | | | | |
|---|---|---|---|---|
| 3,111,513 A | * | 11/1963 | Battista et al. | 536/56 |
| 3,557,020 A | * | 1/1971 | Osaka et al. | 502/426 |
| 3,703,453 A | * | 11/1972 | Harris et al. | 588/303 |
| 3,832,306 A | * | 8/1974 | Hackett | 502/419 |

(Continued)

FOREIGN PATENT DOCUMENTS

CN 101774572 A 7/2010

(Continued)

OTHER PUBLICATIONS

Khanna et al. (Handbook of Bioenergy Economics and Policy, Chapter 4 Present and Furture Possibilities for the Deconstruction and Utilization of Lignocellulosic Biomass; Dec. 2009).*

(Continued)

*Primary Examiner* — Melvin C Mayes
*Assistant Examiner* — Guinever Gregorio
(74) *Attorney, Agent, or Firm* — Westerman, Hattori, Daniels & Adrian, LLP

(57) ABSTRACT

A method for producing carbon using less thermal energy is disclosed. Crystalline cellulose and acidic electrolyzed water are introduced into a reaction vessel. The mixture is heated until it reaches a predetermined temperature (230° C. to 250° C.) while being stirred. When the mixture reached the predetermined temperature, this temperature is maintained, and the mixture is kept heated while being stirred for a predetermined period of time (30 minutes). Thereby, carbon is produced in the reaction vessel.

2 Claims, 3 Drawing Sheets

U.S. PATENT DOCUMENTS

| | | | |
|---|---|---|---|
| 3,960,768 A * | 6/1976 | Ripperger et al. | 502/8 |
| 3,998,756 A * | 12/1976 | Sutherland | 502/426 |
| 4,318,710 A * | 3/1982 | Pilipski | 423/445 R |
| 4,425,256 A * | 1/1984 | Pilipski | 502/418 |
| 8,013,130 B2 * | 9/2011 | Yanagawa et al. | 530/500 |
| 2009/0142252 A1 | 6/2009 | Nagata et al. | |

FOREIGN PATENT DOCUMENTS

| | | |
|---|---|---|
| EP | 2332928 A2 | 6/2011 |
| JP | 2008-201651 A | 9/2008 |
| WO | 2007/017650 A1 | 2/2007 |

OTHER PUBLICATIONS

Wang B et al.; "An Environmental friendly pretreatment of biomass for the production of xylooligosaccharide and other value-added products", Annual Meeting and Fall Showcase, Conference Proceeding, 2005 (cited in European Search Report dated Aug. 10, 2011)XP002649654.

European Search Report dated Aug. 10, 2011, issued in corresponding European Patent Applicatiion No. 11162457.3.

* cited by examiner

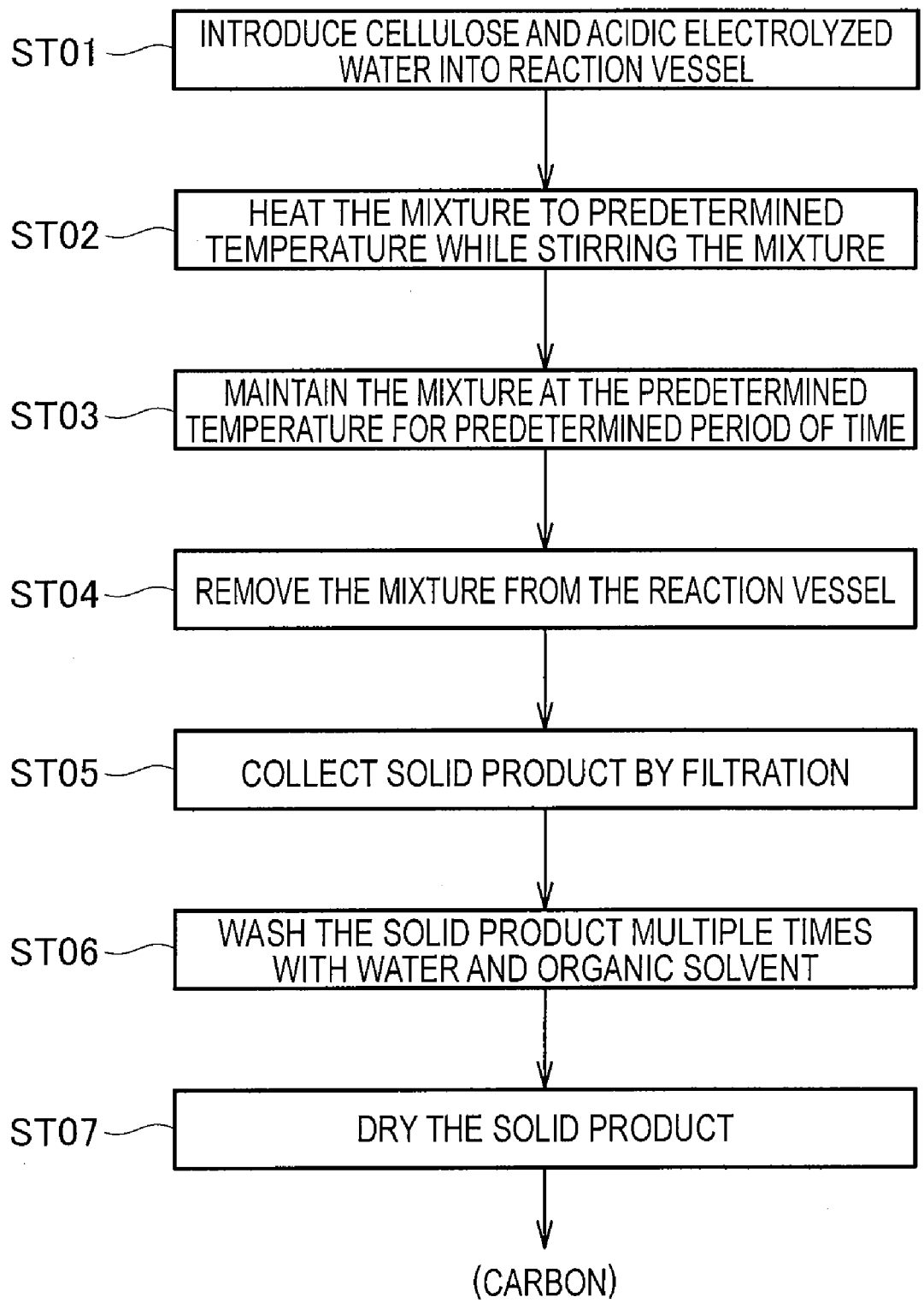

US 8,192,712 B2

CARBON MANUFACTURING METHOD

FIELD OF THE INVENTION

The present invention relates to a method for producing carbon by using cellulose as a starting material.

BACKGROUND OF THE INVENTION

Carbon is widely used as a fuel, an electrode, a fiber, an absorbent, and an additive. Carbon is most produced from petroleum or coal. However, petroleum and coal are so-called fossil fuels, and depletion thereof is a matter of deep concern.

On the other hand, cellulose $(C_6H_{10}O_5)_n$, which is contained in wood or grass, is the most abundant hydrocarbon on the earth. Since cellulose is a hydrocarbon, carbon (C) is obtained by excluding a water ($H_2O$) component therefrom.

Thus, as disclosed in Japanese Patent Application Laid-Open Publication No. 2008-201651 (JP-A 2008-201651), studies have been conducted on the production of carbon using cellulose as a starting material.

The apparatus for manufacturing porous carbon as disclosed in JP-A 2008-201651 includes a drying furnace, a carbonizing furnace, a high temperature water vapor generating apparatus, and a deodorizing furnace. Wood chips as a raw material are dried in the drying furnace, and are subsequently subjected to a high temperature treatment in the carbonizing furnace. The resulting product is discharged from the carbonizing furnace in the form of activated carbon.

At this time, superheated vapor at 750° C. to 950° C. is generated in the high temperature water vapor generating apparatus which uses LPG (liquefied propane gas) as a heat source, this superheated vapor is supplied to the carbonizing furnace, and thus the high temperature treatment is performed. The high temperature vapor that has been used in the carbonizing furnace is supplied to the drying furnace, and is provided for drying. The air generated during this drying is accompanied by foul odor. Thus, the air obtained after the drying is deodorized through incineration in the deodorizing furnace. Kerosene is used for this incineration.

As such, in order to generate superheated vapor at 750° C. to 950° C., a large amount of liquefied propane gas is consumed, and a large amount of kerosene is consumed for deodorization and incineration. That is, the technology disclosed in JP-A No. 2008-201651 requires large amounts of fossil fuels.

Hence, under the current situation in which there is a concern for depletion of fossil fuels, there is a demand for a production technology for obtaining carbon using less heat energy.

SUMMARY OF THE INVENTION

It is therefore an object of the present invention to provide a manufacturing method for obtaining carbon using less heat energy.

According to the present invention, there is provided a carbon manufacturing method for producing carbon using cellulose as a starting material, the method comprising the steps of introducing cellulose and acidic electrolyzed water that has been produced by an electrolytic method, into a sealing reaction vessel (32); heating a mixture of the cellulose and the acidic electrolyzed water to a predetermined temperature while stirring the mixture; retaining the heated mixture, when reached the predetermined temperature, under a saturated vapor pressure for a predetermined period of time while stirring the mixture at the predetermined temperature; and cooling the mixture, retained at the saturated vapor pressure for the predetermined period of time, to a room temperature.

Since carbon has been traditionally produced through dry distillation using a gas (baking in a sealed vessel), a deodorization treatment caused by the gas is indispensable, and there is a need to add a large amount of thermal energy so as to bring the temperature to the dry distillation temperature. From this point of view, since carbon is produced using acidic electrolyzed water in the present invention, the deodorization treatment is easy, and there is no need to add a large amount of heat energy.

Preferably, the acidic electrolyzed water has a degree of acidity falling in a range of pH 2.3 to pH 2.7, while the predetermined temperature falls in a range of 230° C. to 250° C. Carbon is thus obtained with an amount of thermal energy that is around one-third of what is required for the heating temperatures of the related art (750° C. to 950° C.).

Desirably, the starting material comprises one of absorbent cotton, gauze and filter paper containing the cellulose as a main component. Since absorbent cotton, gauze and filter paper are sold in the market and are easily available at inexpensive prices, the production cost of carbon can be lowered.

BRIEF DESCRIPTION OF THE DRAWINGS

A preferred embodiment of the present invention will be described in detail below, by way of example only, with reference to the accompanying drawings, in which:

FIG. 3 is a flow chart showing carbon manufacturing steps.

DETAILED DESCRIPTION OF THE PREFERRED EMBODIMENT

First, the manufacturing principle of acidic electrolyzed water, which is an important material, will be described.

Figure 1:
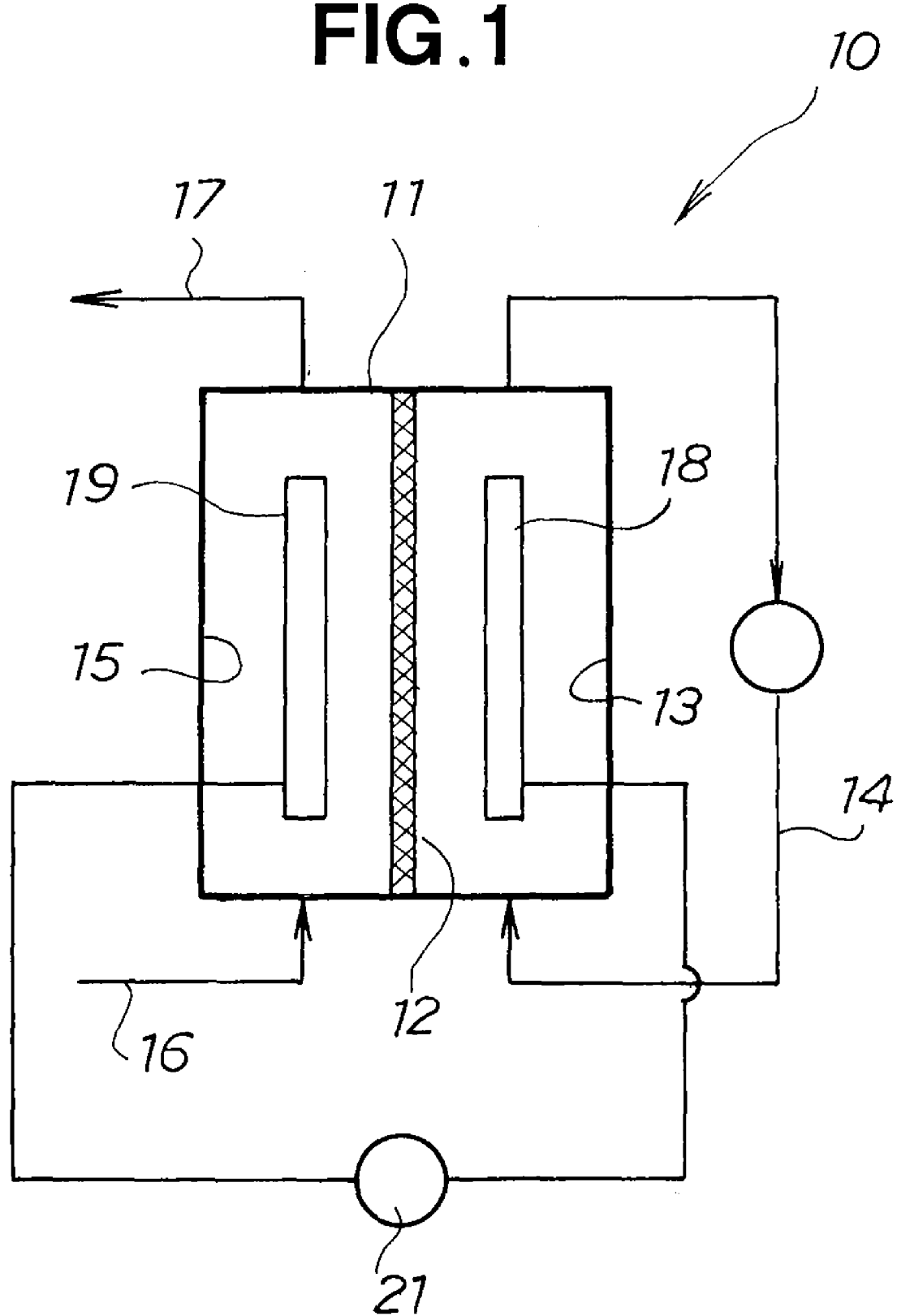
FIG. 1 is a diagrammatical view illustrating the principle of an acidic electrolyzed water producing apparatus used in the present invention.

As shown in FIG. 1, an acidic electrolyzed water producing apparatus 10 includes an electrolytic bath 11; an anion exchange membrane 12 that divides the electrolytic bath 11 into a right chamber and a left chamber; an aqueous solution circulating device 14 that circulates an electrolyte aqueous solution to the right chamber 13; a water supply pipe 16 that supplies tap water to the left chamber 15; an electrolyzed water extraction pipe 17 that draws acidic electrolyzed water from the left chamber 15; a negative electrode 18 that is placed in the right chamber 13; a positive electrode 19 that is placed in the left chamber 15; and a power supply 21 that applies a predetermined voltage to these electrodes 18 and 19.

An aqueous solution of sodium chloride (NaCl) is filled in the right chamber 13 and is circulated with the aqueous solution circulating device 14.

The left chamber 15 is filled with tap water ($H_2O+Cl^-$). A predetermined voltage is then applied to the electrodes 18 and 19 using the power supply 21.

Subsequently, in the right chamber 13, sodium chloride (NaCl) is decomposed, and thereby sodium ions (Na$^+$) and chloride ions (Cl$^-$) are produced. Since the anion exchange membrane 12 allows only anions to pass through, the chloride ions (Cl$^-$) migrate to the left chamber 15.

In the left chamber 15, the chloride ions (Cl$^-$) from the right chamber 13 are added to the chloride ions (Cl$^-$) contained in tap water, and the concentration of chloride ions (Cl$^-$) increases. Thus, the following chemical reactions proceed in the presence of water ($H_2O$) contained in the tap water.

$2Cl^- \rightarrow Cl_2 + 2e^-$ $Cl_2 + 2H_2O \rightarrow 2HClO + 2H^-$ $H_2O \rightarrow \frac{1}{2}O_2 + 2H^+ + 2e^-$ That is, chlorine ($Cl_2$) is produced from the chloride ions ($Cl^-$). This chlorine ($Cl_2$) reacts with water, and hypochlorous acid (HClO) is produced. Furthermore, water is electrolyzed, and oxygen ($O_2$) and hydride ions ($H^-$) are produced. As a result, acidic electrolyzed water containing hydride ions ($H^-$) and hypochlorous acid (HClO) can be extracted through the electrolyzed water extraction pipe 17. This acidic electrolyzed water is a sodium-free acidic electrolyzed water which does not contain any sodium.

Next, the apparatus for manufacturing carbon will be explained based on FIG. 2.

Figure 2:
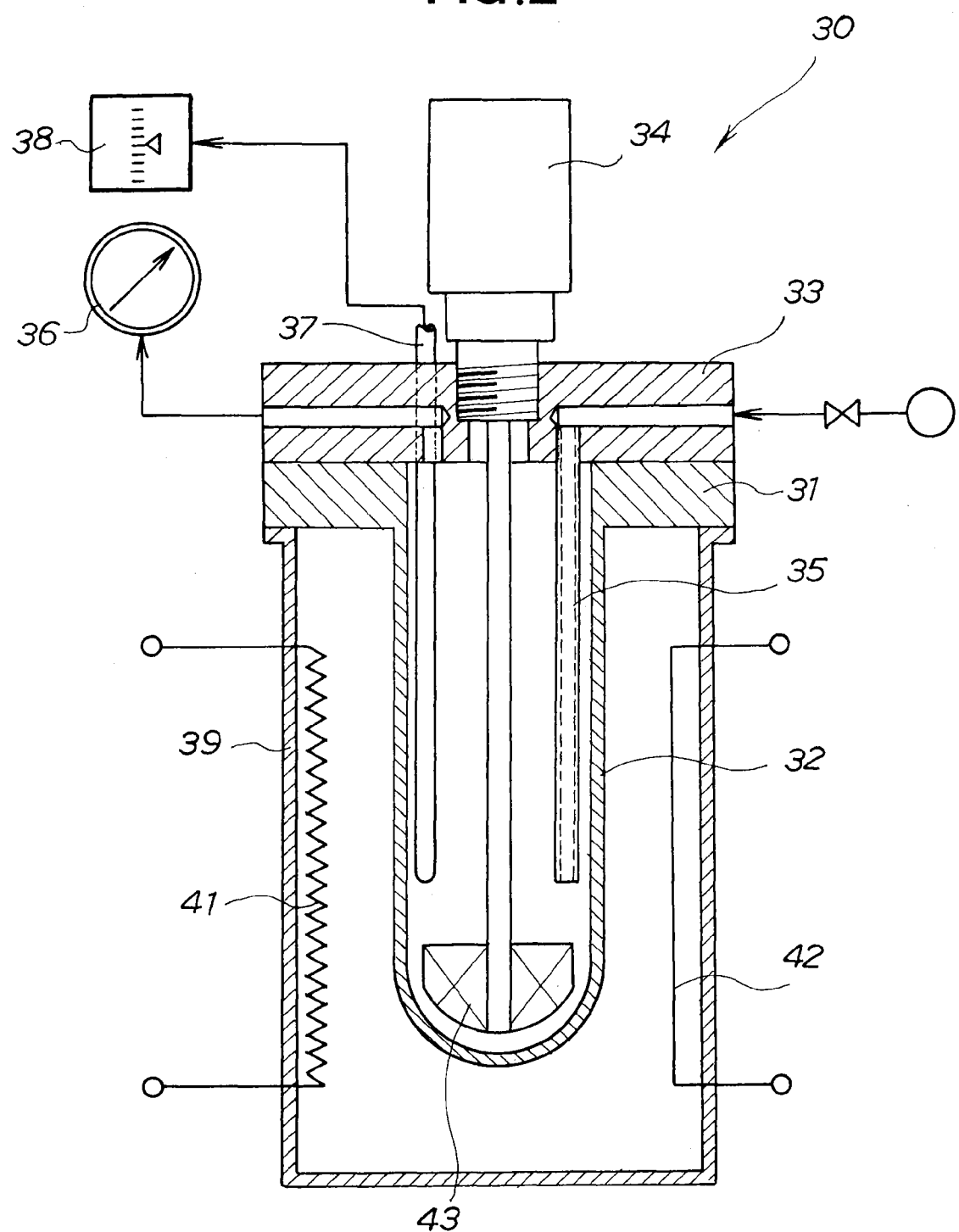
FIG. 2 is a cross-sectional view showing the fundamental structure of the carbon manufacturing apparatus according to the present embodiment.

Referring to FIG. 2, the apparatus for manufacturing carbon 30 includes a tube type reaction vessel 32 that is open at the top and has a flange 31 in the upper part and a hemispherical shell-shaped bottom in the lower part; a lid 33 that covers the top opening of the reaction vessel 32; a stirring motor 34, a liquid supply pipe 35, a pressure gauge 36 and a thermocouple protecting tube 37 that are provided on the lid 33; a thermometer 38 that converts the electrical information of the thermocouple placed in the thermocouple protecting tube 37, into temperature information; a jacket 39 that surrounds the reaction vessel 32; a heater 41 and a water cooling tube 42 that are attached to the jacket 39; and a stirring blade 43 that is suspended from the stirring motor 34. The reaction vessel 32 turns into a sealing reaction vessel when tightly closed with the lid 33.

In such a reaction vessel 32, crystalline cellulose is introduced, and the lid 33 is closed. Subsequently, a predetermined amount of the acidic electrolyzed water is supplied into the reaction vessel 32 through the liquid supply pipe 35. The resulting mixture is heated with the heater 41, and while the temperature is monitored with the thermometer 38 and the pressure is monitored with the pressure gauge 36, the mixture is stirred with the stirring blade 43. In order to control the pressure, it is preferable to have an inert gas injection pipe or a pressure relief pipe attached to the reaction vessel.

The method for manufacturing carbon using the apparatus for manufacturing carbon 30 described above, will be described below based on FIG. 3.

As shown in FIG. 3, crystalline cellulose and acidic electrolyzed water are placed in the reaction vessel (ST01).

The mixture is heated to reach a predetermined temperature (230° C. to 250° C.) under stirring (ST02).

When it reaches the predetermined temperature, this temperature is maintained, and the mixture is kept heated under stirring until a predetermined period of time elapses (ST03). Thereby, carbon is produced in the reaction vessel.

The reaction vessel is cooled at a rate of about 50° C. per minute, and when the temperature reaches normal temperature, the mixture is removed from the reaction vessel (ST04).

The mixture is filtered, and thereby a solid product is obtained (ST05).

Furthermore, the solid product is repeatedly subjected to washing with an organic solvent (ethanol, acetone or the like) and washing with water (ST06). The solid product is dried (ST07). Thus, desired carbon is obtained.

That is, the method for manufacturing carbon of the present invention includes a step of introducing cellulose and acidic electrolyzed water that has been produced by an electrolytic method, into a sealing reaction vessel (ST01); a heating step of heating the mixture composed of cellulose and acidic electrolyzed water to a predetermined temperature under stirring (ST02); a retention step of retaining the heated mixture, when the mixture reaches a predetermined temperature, at the saturated vapor pressure for a predetermined period of time while stirring the mixture at the predetermined temperature (ST03); and a cooling step of cooling the mixture that has been retained at the saturated vapor pressure for a predetermined period of time, to room temperature (ST04).

An Experiment Example which carried out the above manufacturing process will be explained below.

EXPERIMENT EXAMPLE

An Experiment Example according to the present invention will be described below. However, the present invention is not intended to be limited to the Experiment Example.

(1) Experiments 01 to 03: Experiments to Check Degree of Acidity (pH) of Acidic Electrolyzed Water:

The experiment is carried out by varying the degree of acidity (pH) of the acidic electrolyzed water, and a suitable degree of acidity is found.

Starting Materials and the Like:
Cellulose: 2 g of crystalline cellulose
Acidic electrolyzed water: 100 $cm^3$
Experiment 01: pH 3.1, effective chlorine concentration: 23 ppm, oxidation reduction potential: 1.10 V
Experiment 02: pH 2.7, effective chlorine concentration: 30 ppm, oxidation reduction potential: 1.13 V
Experiment 03: pH 2.3, effective chlorine concentration: 40 ppm, oxidation reduction potential: 1.20 V The oxidation reduction potential was measured using a silver-silver chloride (Ag/AgCl) electrode, instead of a standard hydrogen electrode.

Treatment Conditions:
Heating temperature: 230° C.
Pressure: Saturated vapor pressure
Retention time: 30 minutes The starting materials were treated under the conditions described above, the product was cooled, separated by filtration, and washed, and thus a solid product was obtained. The forms of the solid products thus obtained were as indicated below.

TABLE 1

|  | Starting materials | | Treatment conditions | | | Solid product | | | |
| --- | --- | --- | --- | --- | --- | --- | --- | --- | --- |
|  | Cellulose | Acidic electrolyzed water | Temperature | Pressure | Time | Color | Main component | Yield | Evaluation |
| Experiment 01 | 2 g | 100 $cm^3$ pH 3.1 | 230° C. | Saturated vapor pressure | 30 minutes | Brown | Cellulose | 0 | X |
| Experiment 02 | 2 g | 100 $cm^3$ pH 2.7 | 230° C. | Saturated vapor pressure | 30 minutes | Black | Carbon | 33% | ◯ |
| Experiment 03 | 2 g | 100 $cm^3$ pH 2.3 | 230° C. | Saturated vapor pressure | 30 minutes | Black | Carbon | 50% | ⊙ |

In the Table, the yield was calculated by the calculation formula: {(Mass of solid product after washing)/(Mass of solid product before washing)}×100.

In the Experiment 01 performed using an acidic electrolyzed water at pH 3.1, the solid product was brown-colored cellulose. Since carbon was not obtained, the evaluation result was rated as x.

In the Experiment 02 performed using an acidic electrolyzed water at pH 2.7 which had stronger acidity than the Experiment 01, black carbon (the material was confirmed to be carbon through the procedure that will be described below) was obtained as the solid product. The yield was 33%, and since carbon was obtained, the evaluation result was rated as ○.

In the Experiment 03 performed using an acidic electrolyzed water at pH 2.3 which had stronger acidity than the Experiment 02, black carbon was obtained as the solid product. The yield was 50%, and since the yield was better than that of the Experiment 02, the evaluation result was rated as ◉.

Confirmation that Solid Product is Carbon:

According to the Experiment 03, the acidic electrolyzed water at pH 2.3 was suitable. Thus, the pH was fixed at that value, and an experiment for verifying the heating temperature was carried out.

(2) Experiments 04 to 07: Experiment for Verification of Heating Temperature:

Starting Materials and the Like:
Cellulose: 2 g of crystalline cellulose
Acidic electrolyzed water: 100 cm$^3$
pH 2.3, effective chlorine concentration: 40 ppm, oxidation reduction potential=1.20 V
Treatment Conditions:
Heating temperature: 220° C., 240° C., 250° C., 260° C.
Pressure: Saturated vapor pressure
Retention time: 30 minutes The starting materials were treated under the conditions described above, the product was cooled, separated by filtration and washed, and thus a solid product was obtained. The forms of the solid products thus obtained were as indicated in Table 2.

TABLE 2

| | Starting materials | | Treatment conditions | | | Solid product | | | |
|---|---|---|---|---|---|---|---|---|---|
| | Cellulose | Acidic electrolyzed water | Temperature | Pressure | Time | Color | Main component | Yield | Evaluation |
| Experiment 04 | 2 g | 100 cm$^3$ pH 2.3 | 220° C. | Saturated vapor pressure | 30 minutes | Brown | Cellulose | 0 | X |
| Experiment 05 | 2 g | 100 cm$^3$ pH 2.3 | 240° C. | Saturated vapor pressure | 30 minutes | Black | Carbon | 50% | ◉ |
| Experiment 06 | 2 g | 100 cm$^3$ pH 2.3 | 250° C. | Saturated vapor pressure | 30 minutes | Black | Carbon | 30% | ○ |
| Experiment 07 | 2 g | 100 cm$^3$ pH 2.3 | 260° C. | Saturated vapor pressure | 30 minutes | Black | Carbon | 2% | X |

The solid products obtained in the Experiments 02 and 03 were observed with a scanning electron microscope (SEM), and a form looking like a bunch of grapes with a size of 5 to 10 μm was confirmed. An elemental analysis was carried out using a fluorescent energy dispersive X-ray analysis (EDX) attached to the scanning electron microscope (SEM), and carbon and oxygen were detected. It can be speculated by the oxygen that washing water remains. Hydrogen was not detected.

In an X-ray analysis, broad peaks appeared at around $2\theta=22°$.

In a Raman spectroscopic analysis, peaks were present in the region of 1580 to 1600 cm$^{-1}$, that is around 1590 cm$^{-1}$.

An examination with X-ray photoelectron spectroscopy (XPS) was also carried out.

Furthermore, the electrical conductivity was measured according to JIS K1469, and an electrical conductivity of 3.1 Ωcm was obtained when the bulk density was 0.59/cm$^3$.

It was confirmed by the plural analyses and measurements described above that the solid products were carbon.

Suitable pH:

As shown in Table 1, pH 3.1 was rated as x, pH 2.7 as ○, and pH 2.3 as ◉. From these results, it was found that stronger acidity was evaluated to be more effective. However, a strong acidity exceeding pH 2 causes an increase in the cost for acid production. Furthermore, the cost for a neutralization treatment or washing also increases. In terms of cost, it is desirable to set the pH to 2.3. That is, a pH range of 2.3 to 2.7 is suitable.

In the Experiment 04 in which the heating temperature was 220° C., the solid product was brown cellulose. Since carbon was not obtained, the evaluation result is rated as x.

In the Experiment 05 in which the heating temperature was 240° C., the solid product was black carbon. Since the yield was up to 50%, the evaluation result is rated as ◉.

In the Experiment 06 in which the heating temperature was 250° C., the solid product was black carbon. Since the yield was around 30%, the evaluation result is rated as ○.

In the Experiment 07 in which the heating temperature was 260° C., the solid product was black carbon. Since the yield was small (about 2%), the evaluation result is rated as x.

Suitable Heating Temperature:

Based on the results of Table 1, the temperature of 230° C. is recommended. Based on the results of Table 2, the temperature of 240° C. used in the Experiment 05 and the temperature of 250° C. used in the Experiment 06 are recommended. At the temperature of 220° C. used in the Experiment 04, carbon cannot be obtained. Furthermore, at the temperature of 260° C. used in the Experiment 07, the production quantity cannot be secured. Thus, the heating temperature is suitably in the range of 230° C. to 250° C.

Next, an experiment to verify the usage and usefulness of the carbon obtained by the present invention was carried out.

(3) Metal Adsorbability:
Preparation:
Solution: Aqua regia (mixture of concentrated hydrochloric acid and concentrated nitric acid at a volume ratio of 3:1), adjusted to pH 4.0, 50 cm$^3$ Metal: 12 kinds including Au (gold)
Carbon: Carbon powder obtained in Experiment 03, 50 mg
Experiment:
A metal is dissolved in the solution, and the carbon powder is further added thereto. The mixture is stirred. After 2 hours, the surface coverage of carbon was examined. The surface coverage is indicated as {(Mass adsorbed on carbon)/(Mass added to solution)}×100.

TABLE 3

| Metal | Surface coverage |
| --- | --- |
| Au | 94% or more |
| Ga | 99% or more |
| In | 74% |
| Pd | 73% |
| Pt | 14% |
| Ru | 99% or more |
| Y | 1% |
| Co, Ir, Li, Ni, Rh | 0% |

The surface coverage exceeded 90% for Au (gold), Ga (gallium) and Ru (ruthenium). Furthermore, the surface coverage exceeded 70% for In (indium) and Pd (palladium). As can be seen from this, metals can be extracted from the solutions containing metals.

(4) Toluene Adsorbability:
Preparation:
Toluene
Carbon: Carbon obtained in Experiment 03
Volumetric gas adsorption apparatus
Experiment:
Carbon was placed on a volumetric gas adsorption apparatus, and toluene (gas) was adsorbed thereon. 100 g of carbon could adsorb 15.6 g of toluene. That is, it could be confirmed that the carbon products obtained in the present Example have an adsorption performance close to that of activated carbon.

(5) Type of Cellulose:
Absorbent cotton, gauze and filter paper, which contain cellulose as their main components, were used as starting materials instead of crystalline cellulose, and the starting materials were treated under the same conditions as those of the Experiment 03 indicated in Table 1. Thus, black carbon could be obtained. Since absorbent cotton, gauze and filter paper are sold in the market and are easily available at inexpensive prices, the production cost of carbon can be lowered.

Conventionally, carbon which is represented by charcoal has been produced with technologies such as dry distillation, baking in a sealed vessel and thermal decomposition using woody materials. In such conventional technologies, gases having foul odor are generated unavoidably, and therefore, a deodorizing apparatus is indispensable.

In the present invention, carbon (C) was successfully obtained by decomposing cellulose $(C_6H_{10}O_5)_n$ in acidic electrolyzed water. Since the reaction is carried out in water, all of those side products that are generated concomitantly with the reaction may be entrapped in water. With water, removal or detoxification of the side products can be easily achieved by filtration or neutralization. In addition, large amounts of thermal energy are not required, unlike the case of dry distillation.

The starting material of the present invention are suitably crystalline cellulose, absorbent cotton, gauze and filter paper; however, the starting material may also be a woody material which is represented by wood chips, or may be grass which is represented by straw, and there are no limitation on the type.

The present invention is suitable for a technology of producing carbon from crystalline cellulose.

Obviously, various minor changes and modifications of the present invention are possible in light of the above teaching. It is therefore to be understood that within the scope of the appended claims the invention may be practiced otherwise than as specifically described.

What is claimed is:

1. A carbon manufacturing method for producing carbon using cellulose as a starting material, the method comprising the steps of:
    introducing cellulose and acidic electrolyzed water that has been produced by an electrolytic method, into a sealing reaction vessel;
    heating a mixture of the cellulose and the acidic electrolyzed water to a predetermined temperature while stirring the mixture;
    retaining the heated mixture, when it has reached the predetermined temperature, under a saturated vapor pressure for a predetermined period of time while stirring the mixture at the predetermined temperature;
    cooling the mixture, retained at the saturated vapor pressure for the predetermined period of time, to a room temperature, and
    obtaining carbon from the mixture, wherein the acidic electrolyzed water has a degree of acidity falling in a range of pH 2.3 to pH 2.7, and the predetermined temperature falls in a range of 230° C. to 250° C.

2. The carbon manufacturing method of claim 1, wherein the starting material comprises one of absorbent cotton, gauze and filter paper containing the cellulose as a main component.

* * * * *